US010146273B1

(12) United States Patent
Noorbakhsh (10) Patent No.: US 10,146,273 B1
(45) Date of Patent: Dec. 4, 2018

(54) CARRIER FOR STORAGE DRIVE

(71) Applicant: DELL PRODUCTS, LP, Round Rock, TX (US)

(72) Inventor: Bijan Noorbakhsh, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/676,243

(22) Filed: Aug. 14, 2017

(51) Int. Cl.
*G06F 1/00* (2006.01)
*G06F 1/18* (2006.01)

(52) U.S. Cl.
CPC .................................. *G06F 1/187* (2013.01)

(58) Field of Classification Search
CPC ..... G06F 1/187; H05K 5/0208; H05K 5/0221
See application file for complete search history.

(56) References Cited

U.S. PATENT DOCUMENTS

| 6,067,225 | A  | * | 5/2000  | Reznikov | G11B 33/122 |
|           |    |   |         |          | 312/223.2 |
| 7,208,686 | B1 |   | 4/2007  | Chen et al. | |
| 9,258,913 | B2 | * | 2/2016  | Terwilliger | H05K 5/0221 |
| 2008/0266781 | A1 | * | 10/2008 | Olesiewicz | G06F 1/187 |
|           |    |   |         |          | 361/679.33 |
| 2010/0321879 | A1 | * | 12/2010 | Peng | G06F 1/187 |
|           |    |   |         |          | 361/679.33 |
| 2011/0049319 | A1 | * | 3/2011  | Peng | G06F 1/187 |
|           |    |   |         |          | 248/309.1 |
| 2011/0101831 | A1 | * | 5/2011  | Wang | G06F 1/187 |
|           |    |   |         |          | 312/223.1 |
| 2011/0304960 | A1 | * | 12/2011 | Lu | G06F 1/187 |
|           |    |   |         |          | 361/679.01 |
| 2015/0235673 | A1 |   | 8/2015  | Lo | |

* cited by examiner

*Primary Examiner* — Daniel J Rohrhoff
(74) *Attorney, Agent, or Firm* — Larson Newman, LLP (57) ABSTRACT

A carrier supports a storage drive that may be removed from a server or other information handling system. The carrier has a dual-lock mechanism that safely secures the storage drive. A primary lock is manually moved along a first axis, and a secondary lock is manually moved along an orthogonal second axis. Only after both the primary lock and the secondary lock are moved may the carrier be removed from the server. The dual-lock mechanism thus reduces accidental disengagement of the storage drive, especially in rugged usage environments.

17 Claims, 6 Drawing Sheets

CARRIER FOR STORAGE DRIVE

FIELD OF THE DISCLOSURE

The present disclosure generally relates to information handling systems, and more particularly relates to carriers or caddies for front-accessible storage drives.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A carrier supports a storage drive that may be removed from a server or other information handling system. The carrier has a dual-lock mechanism that secures the storage drive. A primary lock is manually moved along a first axis, and a secondary lock is manually moved along an orthogonal second axis. Only after both the primary lock and the secondary lock are moved may the carrier be removed from the server. This dual-lock mechanism thus reduces accidental disengagement of the storage drive, especially in rugged usage environments where high shock and vibration are common.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
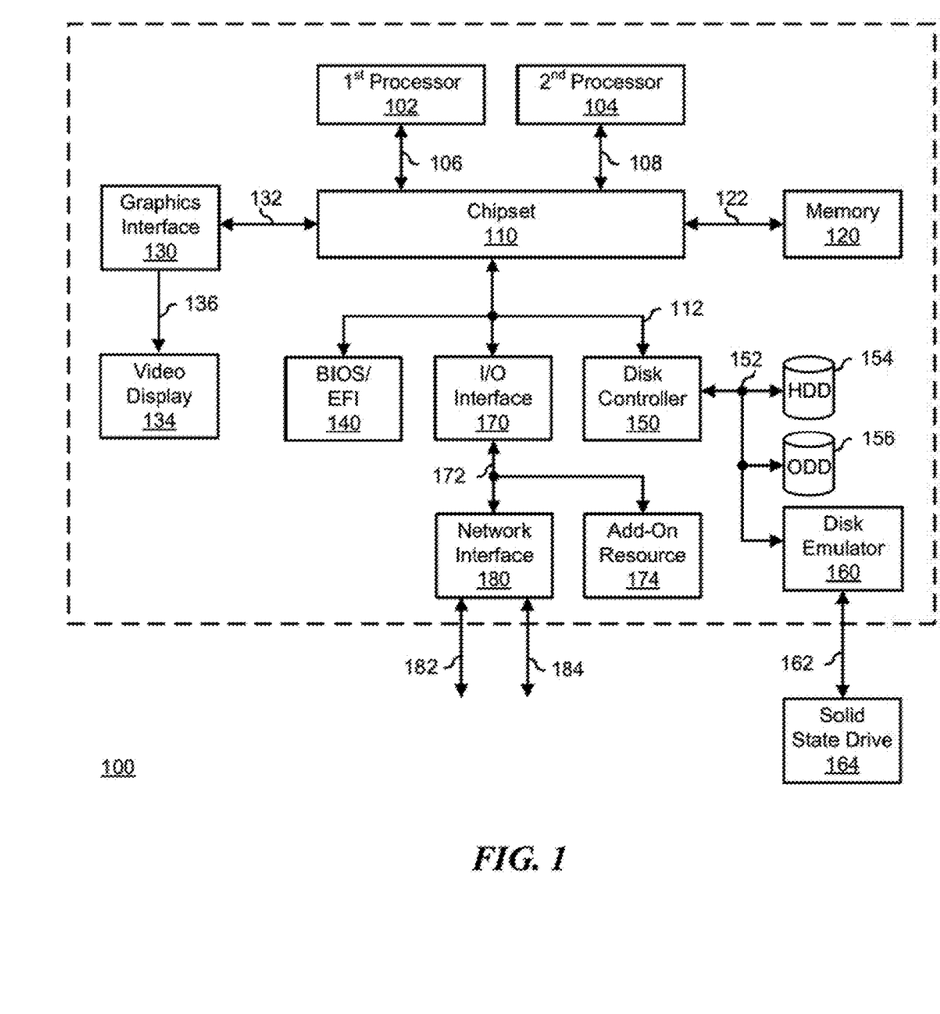
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
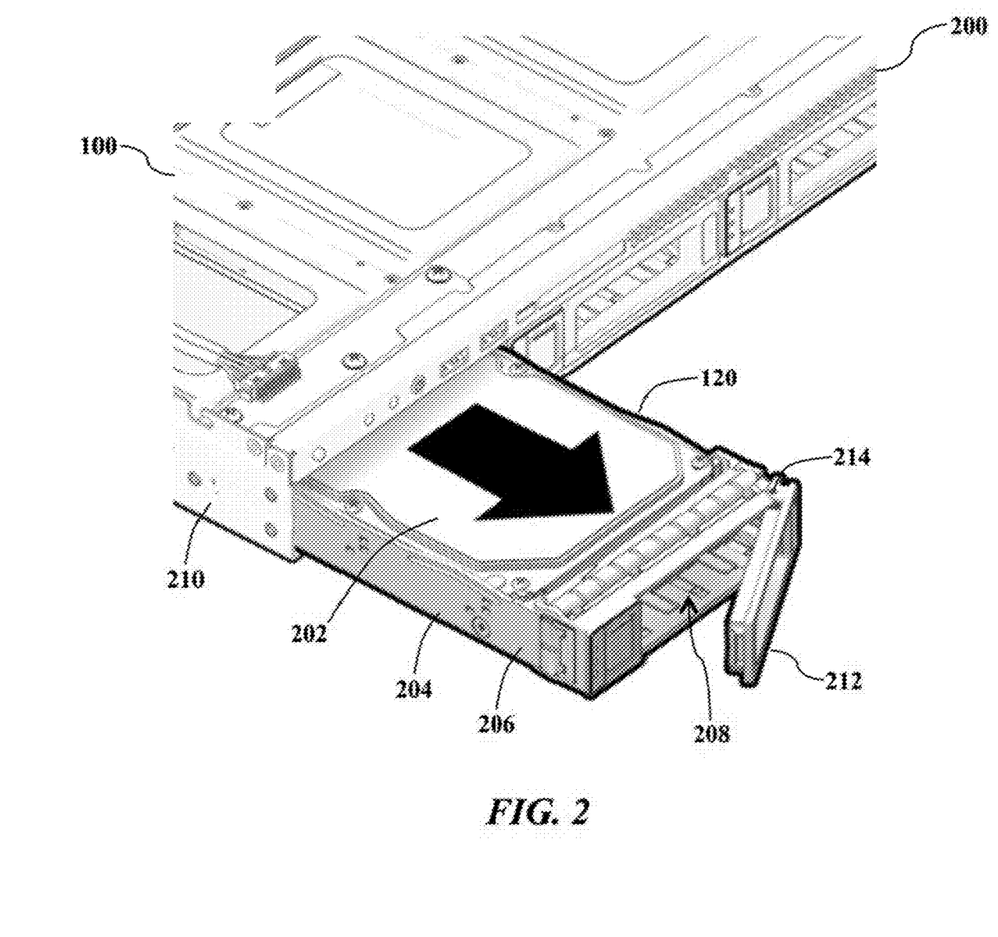
FIG. 2 further illustrates the information handling system, according to exemplary embodiments.

FIG. 2 further illustrates the information handling system 100, according to exemplary embodiments. For simplicity, FIG. 2 only partially illustrates the information handling system 100 as a server 200 having the memory 120 configured as a storage drive 202. The storage drive 202 may be a spinning disk drive, a solid-state memory device, or any other memory configuration or device structure. Regardless, the storage drive 202 is removable from the server 200. That is, the storage drive 202 inserts into, and is removable from, a carrier 204. The carrier 204 has a plurality of supports 206 that generally form a receptacle 208 into which the storage drive 202 inserts. The carrier 204 slides along mating features within a chassis 210 of the server 200. The carrier 204, for example, may mate or engage with rails or slots (not shown for simplicity), thus allowing the carrier 204 to slide in and out from the server 200 for quick, hot swappable replacement of the storage drive 202. The carrier 204 has a front bezel 212 that swings or pivots about a hinge 214. When the bezel 212 is mostly swung open, a human user may then remove or extract the storage drive 202 from the carrier 204. The carrier 204 may thus be a magazine for cradling the storage drive 202.

Figure 3:
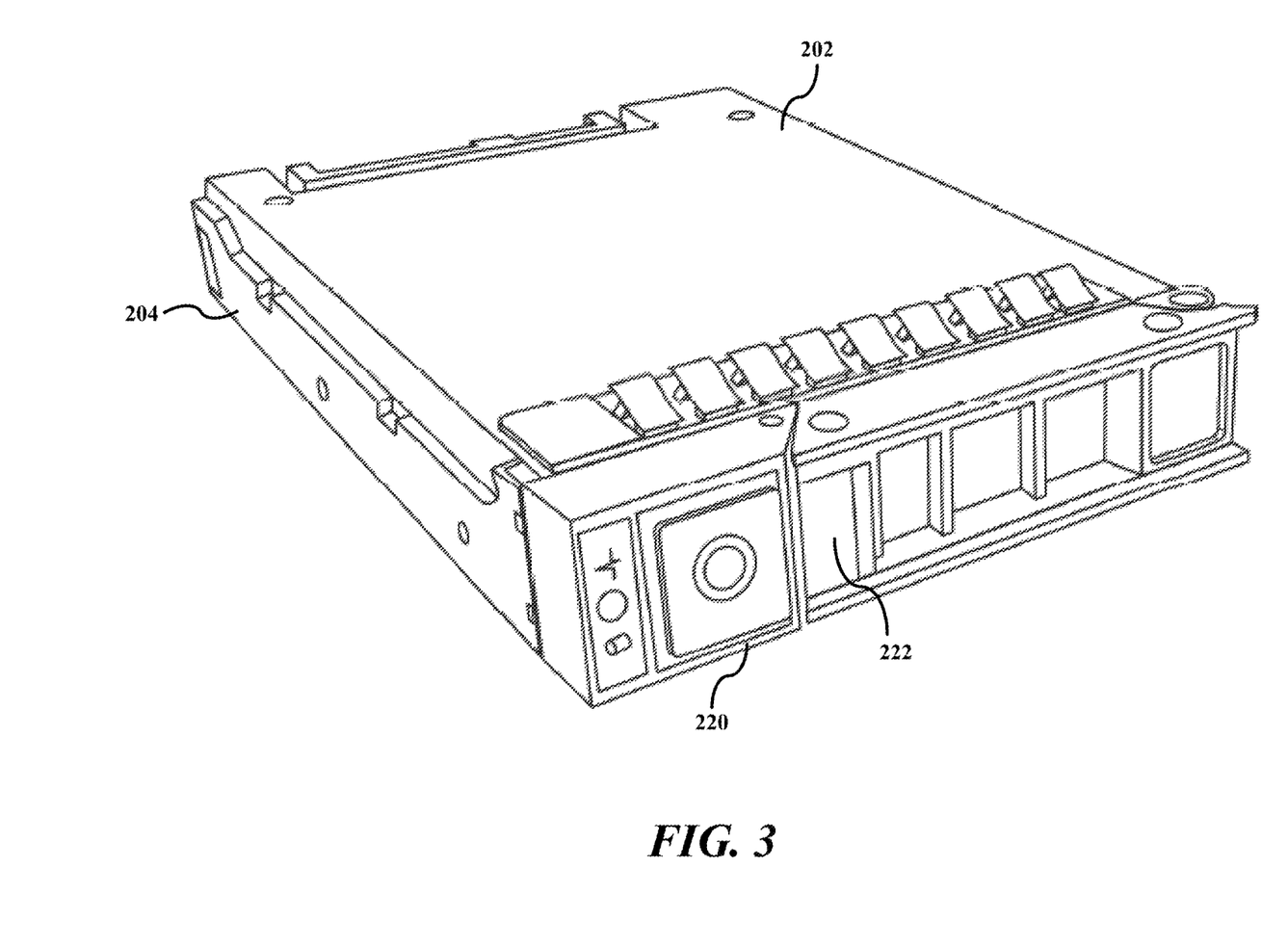
FIG. 3 illustrates locking mechanisms, according to exemplary embodiments.

FIG. 3 illustrates locking mechanisms, according to exemplary embodiments. The carrier 204 has a primary lock 220 and a secondary lock 222. The primary lock 220 allows the carrier 204 to be removed from the server 200 (illustrated in FIG. 2). The secondary lock 222, however, allows operation of the primary lock 220. The secondary lock 222, in other words, prevents accidental or physical movement of the primary lock 220. The secondary lock 222 must be unlocked or disengaged before the primary lock 220 can be unlocked. Both locks 220 and 222 must, therefore, be purposefully unlocked or disengaged to remove the carrier 204 from the server 200.

Exemplary embodiments are especially suited to rugged environments. As the reader may envision, servers and other information technology equipment often experience large magnitude shocks and vibrations that can accidentally dislodge or disengage the carrier 204. If the carrier 204 is sufficiently moved or jolted, the storage drive 202 can become electrically disconnected from the server 200 or backplane and cause a communications or system failure. The secondary lock 222 secures and stops the primary lock 220 from disengaging due to external forces or accidental contacts. The primary lock 220 and the secondary lock 222 thus combine to provide dual-axis protection against accidental movement and removal of the storage drive 202.

Figure 4:
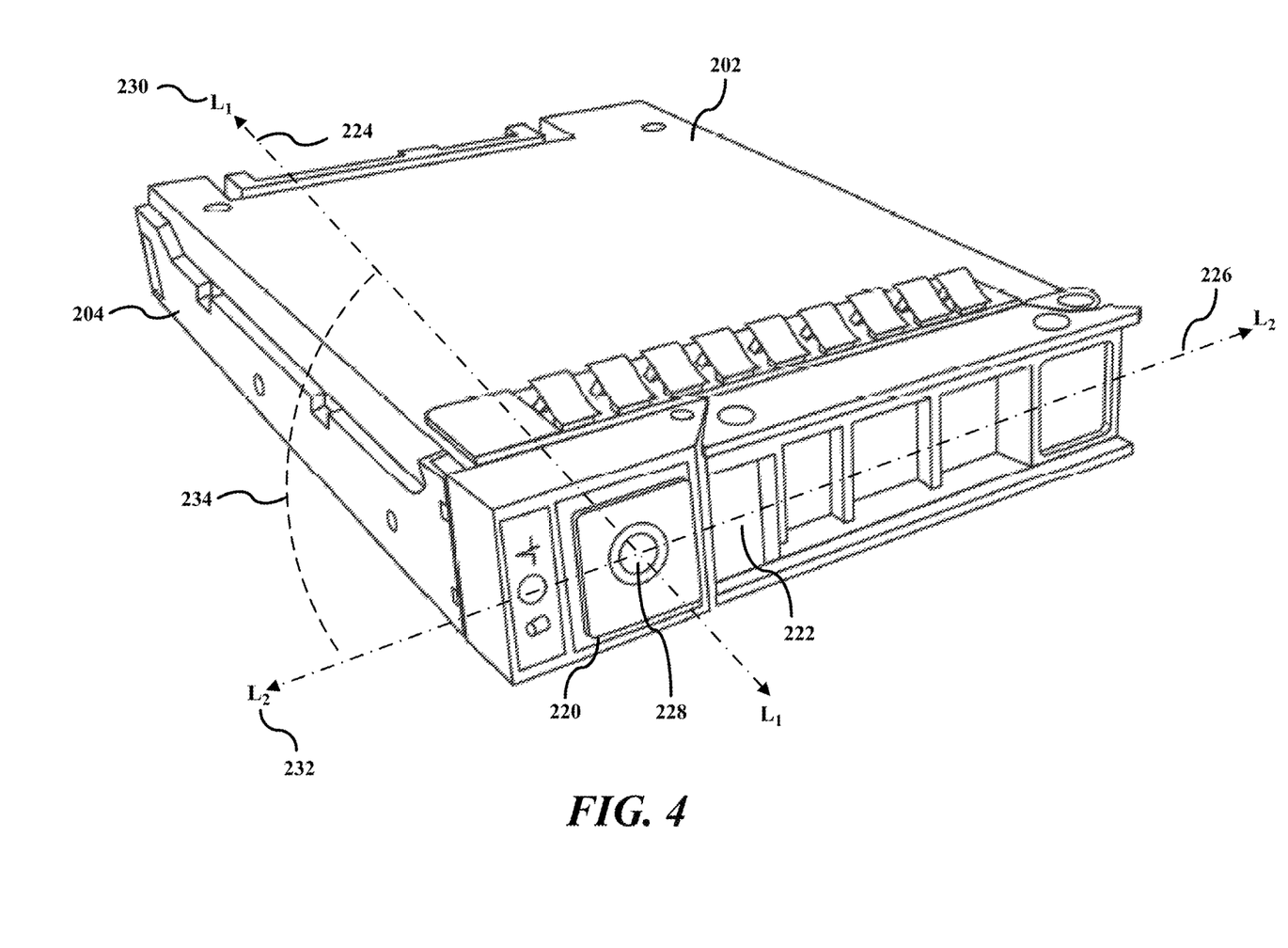
FIG. 4 illustrates directional activation, according to exemplary embodiments.

FIG. 4 illustrates directional activation, according to exemplary embodiments. Here the primary lock 220 must be physically moved in a first direction 224 to unlock, and the secondary lock 222 must be physically moved in second direction 226 to unlock or disengage the primary lock 220. The primary lock 220, for example, is illustrated as a depressible button 228 that is manually moved along a first axis $L_1$-$L_1$ (illustrated as reference numeral 230). The secondary lock 222 is manually moved along a second axis $L_2$-$L_2$ (illustrated as reference numeral 232). While the first axis $L_1$-$L_1$ 230 and the second axis $L_2$-$L_2$ 232 may have any physical arrangement and orientation, FIG. 4 illustrates an orthogonal orientation 234 (e.g., substantially ninety degrees (90°)) between the first axis $L_1$-$L_1$ 230 and the second axis $L_2$-$L_2$ 232.

Figure 5:
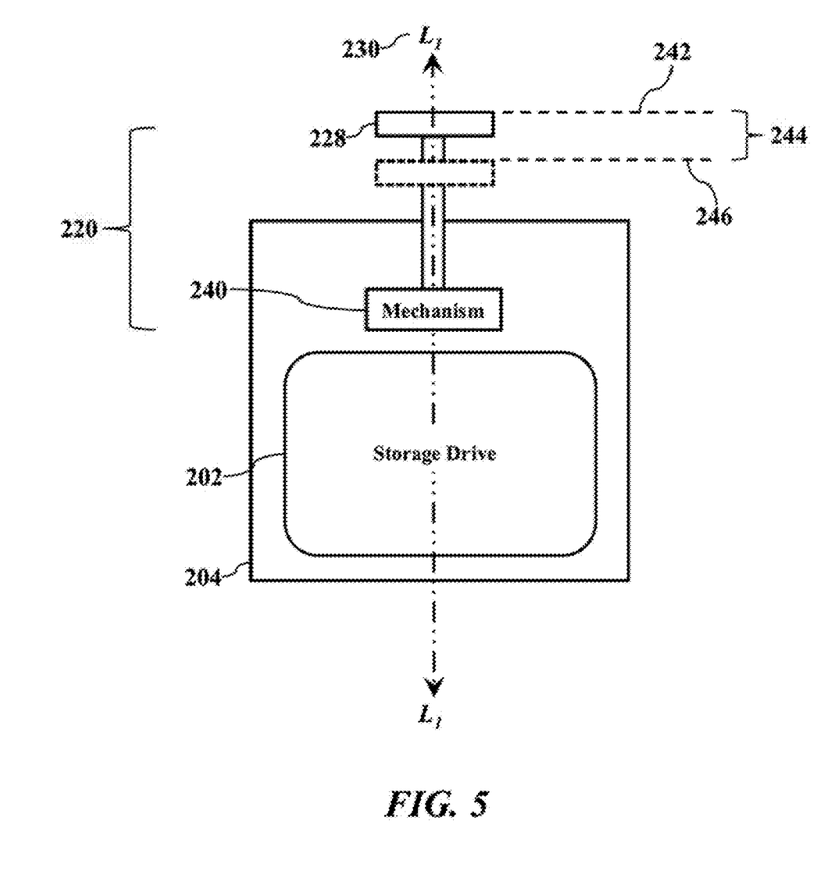
FIG. 5 illustrates a primary lock, according to exemplary embodiments.

FIG. 5 further illustrates the primary lock 220, according to exemplary embodiments. Here the primary lock 220 is simply illustrated for clarity of features and functions. The primary lock 220 has a mechanism 240 that releases, or secures, carrier 204 to the server 200, depending on two positions along the first axis $L_1$-$L_1$ 230. The mechanism 240, though, is only generically shown, as exemplary embodiments may use any lock mechanism. For example, when the button 228 is released or not depressed, the primary lock 220 is in a locked position 252 that mechanically engages the carrier 204 to the server 200, thus preventing a removal of the storage drive 202. However, when the button 228 is manually plunged or depressed (such as by a finger of a human user) a sufficient travel amount or distance 244, the primary lock 220 moves to an unlocked position 246 that mechanically disengages the carrier 204 from the server 200, thus allowing the removal of the carrier 204.

Figure 6:
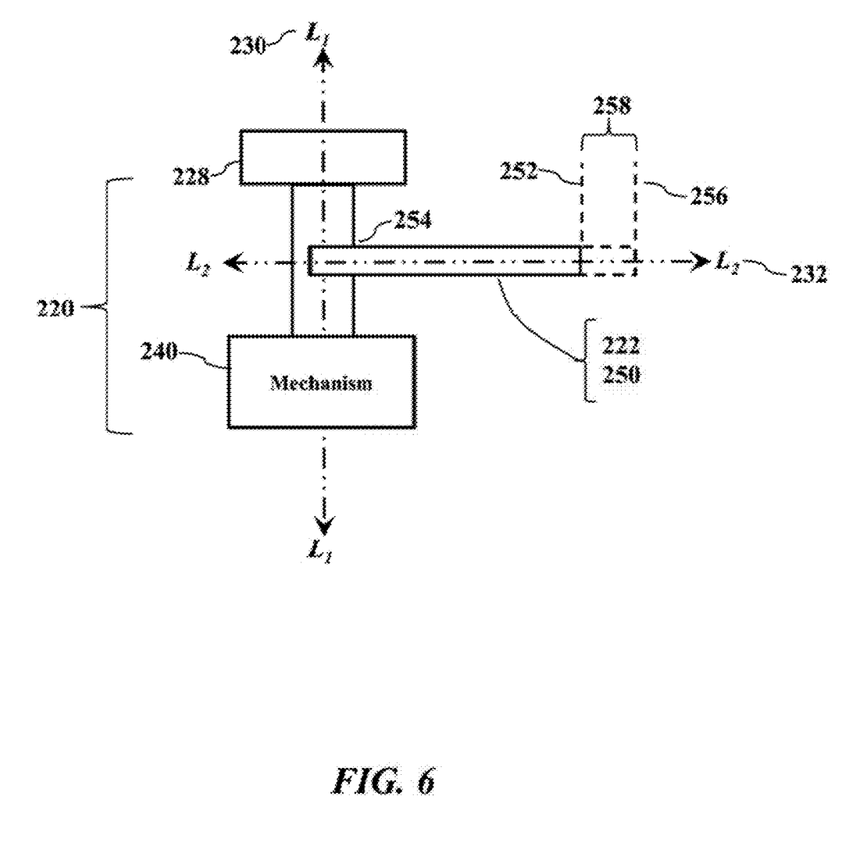
FIG. 6 illustrates a secondary lock, according to exemplary embodiments.

FIG. 6 further illustrates the secondary lock 222, according to exemplary embodiments. The secondary lock 222 is manually and mechanically moved along the second axis $L_2$-$L_2$ 232. The secondary lock 222 is illustrated as a latch 250 that horizontally slides along the second axis $L_2$-$L_2$ 232 between two positions. A first position 252, for example, mechanically engages the primary lock 220 to prevent its movement. That is, the primary lock 220 may have a window, aperture, or slot (generally illustrated as reference numeral 254) through which an end of the latch 250 inserts into and translates within. When the latch 250 is at least partially slid within the slot 254, the latch 250 mechanically engages and restricts the primary lock 220 from moving along the first axis $L_1$-$L_1$ 230. The secondary lock 222 thus physically jams or blocks the primary lock 220, thus preventing the button 228 from being sufficiently depressed to its unlocked position 246 (illustrated in FIG. 5). The carrier 204 thus cannot be removed from the server 200, and the storage drive 202 cannot be removed from the carrier 204. The secondary lock 222 may thus limit motion or movement of the primary lock 220 from its locked position 242 to its unlocked position 246 (again illustrated in FIG. 5).

The secondary lock 222 also has a second position 256. The user may slide or translate the latch 250 in an opposite direction along the second axis $L_2$-$L_2$ 232. When the latch 250 is sufficiently slid a distance or amount 258 to the second position 256, the end of the latch 250 is fully removed from the slot 254. The latch 250 mechanically disengages the primary lock 220, thus allowing the primary lock 220 to be moved or depressed from its locked position 242 to its unlocked position 246 (as FIG. 5 illustrated). The button 228, in other words, may be depressed to its unlocked position 246, thus mechanically disengaging the carrier 204 from the server 200 (again illustrated in FIG. 5).

Orthogonal movement is safer and more secure. A sudden, accidental drop may easily disengage single-axis protection. Exemplary embodiments, though, require deliberate physical movement along the first axis $L_1$-$L_1$ 230 and the orthogonal second axis $L_2$-$L_2$ 232. Because the primary lock 220 must be physically moved in the orthogonal direction 234 to the secondary lock 222, accidental movement of both locks 220 and 222 is substantially reduced.

Exemplary embodiments are also tool-less. Conventional carriers are secured via captive thumbscrews or a separate lock bracket. These thumbscrews or separate lock brackets require the human user to use a tool to install or remove the storage drive 202. As the reader may envision, the tool is rarely available for immediate use and time is often of the essence. Exemplary embodiments thus allow removal and replacement of the storage drive 202 without tools.

User operation is thus quick and easy. The user need only slide the secondary lock 222 along the second axis $L_2$-$L_2$ 232 to its second position 256 to disengage the primary lock 220. The user may then move the primary lock 220 to its unlocked position 246, thus allowing the carrier 204 to be removed from the server 200. Moreover, the bezel 212 may be swung to its open position, thus allowing the storage drive 202 to be extracted from the carrier 204.

The carrier 204 may include other components. For example, the bezel 212 may have a track into which the latch 240 slideably mates. The carrier 204 may have a data cable having one connector end that mates with electrical data pins of the storage drive 202. The data cable may have another connector end that mates with a backplane, thus allowing the information handling system 100 to communicate with, read from, and/or write to the storage drive 202.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A carrier for a storage drive, the carrier comprising:
   a plurality of supports configured to engage a computer chassis;
   a primary lock having two positions, a locked position of the two positions preventing a removal of the carrier from the computer chassis, and an unlocked position of the two positions allowing the removal of the carrier from the computer chassis;
   a depressible button that moves the primary lock from the locked position to the unlocked position; and
   a secondary lock having another two positions, a first position of the another two positions engaging the primary lock to prevent a movement of the primary lock from the locked position to the unlocked position, and a second position of the another two positions disengaging the primary lock to allow the movement of the primary lock from the locked position to the unlocked position.

2. The carrier of claim 1, further comprising a sliding latch of the secondary lock that slides from the first position to the second position.

3. The carrier of claim 1, further comprising a sliding latch of the secondary lock, the sliding latch sliding to the first position to engage the primary lock and to prevent a depression of the depressible button.

4. The carrier of claim 1, further comprising a sliding latch of the secondary lock, the sliding latch sliding to the first position to engage the primary lock and to prevent the movement of the primary lock from the locked position to the unlocked position.

5. The carrier of claim 1, further comprising a hinge that allows the secondary lock to swing with respect to the carrier.

6. The carrier of claim 1, further comprising a receptacle for the storage drive.

7. The carrier of claim 1, further comprising a bezel having a track along which the secondary lock sides slides between the first position that engages the primary lock and the second position that disengages the primary lock.

8. A carrier for a storage drive, the carrier comprising:
   a plurality of supports configured to engage a computer chassis;
   a primary lock having two positions along a first axis, a locked position of the two positions preventing a removal of the carrier from the computer chassis, and an unlocked position of the two positions allowing the removal of the carrier from the computer chassis;
   a secondary lock sliding along a second axis orthogonal to the first axis, the secondary lock having another two positions, a first position of the another two positions engaging the primary lock to prevent a mechanical movement of the primary lock from the locked position to the unlocked position, and a second position of the another two positions disengaging the primary lock to allow the mechanical movement of the primary lock from the locked position to the unlocked position; and
   a hinge that allows the secondary lock to swim with respect to the carrier.

9. The carrier of claim 8, further comprising a sliding latch of the secondary lock that slides along the second axis from the first position to the second position.

10. The carrier of claim 8, further comprising a depressible button that mechanically moves the primary lock along the first axis from the locked position to the unlocked position.

11. The carrier of claim 10, further comprising a sliding latch of the secondary lock, the sliding latch sliding along the second axis to the first position to engage the primary lock and to prevent a depression of the depressible button.

12. The carrier of claim 8, further comprising a sliding latch of the secondary lock, the sliding latch sliding along the second axis to the first position to engage the primary lock and to prevent the mechanical movement of the primary lock from the locked position to the unlocked position.

13. The carrier of claim 8, further comprising a receptacle for the storage drive.

14. The carrier of claim 8, further comprising a bezel of the carrier, the bezel having a track along which the secondary lock slides from the first position that engages the primary lock to the second position that disengages the primary lock.

15. A carrier for a storage drive, the carrier comprising:
   a plurality of supports configured to slideably engage a computer chassis;
   a primary lock having two positions along a first axis, a locked position of the two positions preventing a removal of the carrier from the computer chassis, and an unlocked position of the two positions allowing the removal of the carrier from the computer chassis;
   a secondary lock sliding along a second axis orthogonal to the first axis, the secondary lock having another two positions, a first position of the another two positions engaging the primary lock to prevent a mechanical movement of the primary lock from the locked position to the unlocked position, and a second position of the another two positions disengaging the primary lock to allow the mechanical movement of the primary lock from the locked position to the unlocked position;
   a sliding latch of the secondary lock, the sliding latch sliding along the second axis to the first position to engage the primary lock and to prevent the mechanical movement of the primary lock from the locked position to the unlocked position; and
   a bezel having a track along which the secondary lock slides between the first position that engages the primary lock and the second position that disengages the primary lock.

16. The carrier of claim 15 further comprising a hinge that allows the secondary lock to swing with respect to the carrier.

17. The carrier of claim 15 further comprising a receptacle for the storage drive.

* * * * *

UNITED STATES PATENT AND TRADEMARK OFFICE
CERTIFICATE OF CORRECTION

| | | |
|---|---|---|
| PATENT NO. | : 10,146,273 B1 | Page 1 of 1 |
| APPLICATION NO. | : 15/676243 | |
| DATED | : December 4, 2018 | |
| INVENTOR(S) | : Bijan Noorbakhsh | |

It is certified that error appears in the above-identified patent and that said Letters Patent is hereby corrected as shown below:

In the Claims

Column 7, Line 38: Please change "lock sides slides" to --lock slides--

Signed and Sealed this
Third Day of March, 2020

Andrei Iancu
*Director of the United States Patent and Trademark Office*